UNITED STATES PATENT OFFICE.

BERNARD FEZLING ERDAHL, OF DULUTH, MINNESOTA.

ALGINATE COMPOSITION AND ARTICLE.

1,415,850.   Specification of Letters Patent.   Patented May 9, 1922.

No Drawing.   Application filed December 5, 1921. Serial No. 520,017.

*To all whom it may concern:*

Be it known that I, BERNARD F. ERDAHL, citizen of the United States, residing at Duluth, in the county of St. Louis and State of Minnesota, have invented certain new and useful Improvements in Alginate Compositions and Articles, of which the following is a specification.

The object of my invention is the provision of durable compositions of matter and articles derived therefrom, resulting from the treatment of cellular or pervious materials or articles with a filling, coating, envelope or impregnation of a colloidal metal alginate such as a colloidal ammonio-metal-alginate-gel, preferably fortified as hereinafter described. The extent to which the filling penetrates the cells or interstices of the material and becomes interlocked with the same depends upon the methods used to produce the material and fabricate the article. Both inorganic and organic cellular or pervious materials may be treated with the conference thereto of many beneficial properties. The treatment of materials with my colloidal-metal-alginate-gel preferably fortified, renders them, on drying, water-proof and weatherproof, indurated, resistant to alkali-waters, increases the strength, gives them insulating qualities, and in certain cases renders them insecticide and fungicide-proof and increases the non-flammability.

For the preparation of the materials and articles, I proceed as follows: A colloidal-metal-alginate-gel is prepared by treating a cold solution of an algin base, preferably sodium alginate with a cold solution of a metal compound, such as chloride or sulfate of iron, copper, or aluminum forming a precipitate of the metal-alginate which is impregnated with impurities, the metal chlorides or sulfates, derived from the precipitating operation, and alkali chlorides or sulphates from the reactions taking place. It is of paramount importance that these impurities be removed by repeated washing for if they are not, on the addition of a dissolving and gelling agent, the alginate will not form a gel but will form a product which on drying lacks adhesive and cohesive properties, crumbling to dust, while that part of the product consisting of the salts will dissolve on exposure to water, thus disrupting the structure. After the removal of impurities, the purified alginate is dissolved to a syrupy consistency with cold concentrated ammonia to transform the alginate into a colloidal-ammonio-metal-alginate-gel.

It is essential that all reactions be performed in the cold, in order that the alginate may form a colloidal gel, since it is necessary that the alginate be added to the material to be treated in the gel condition, in order for it to form on drying, a cohesive, adhesive and continuous structure capable of withstanding the disruptive action of water. Temperatures ranging between 32° and 50° F., have been found satisfactory.

Alginates, as ordinarily prepared, do not form a colloidal gel. The alginates prepared by treating an algin base, such as sodium alginate, with iron, aluminum, or copper chloride or sulfate, or products resulting from the treatment of sodium alginate with an acid may at times form a jelly, but this not a colloidal gel in the sense in which the term is understood by those skilled in the art. The jelly referred to is coarse-grained, non-adhesive, and lacks cohesion, crumbling on drying to a fine powder. In addition, such alginates are contaminated with impurities.

In preparing colloidal gels of the insoluble aginates, two conditions must be satisfied, namely, impurities must be removed, and the reactions must occur in the cold. When purified insoluble alginates are treated with ammonia and the reacting compounds are not in the cold state, the colloidal-ammonio-metal-gel will not form, but the insoluble compounds will dissolve in the ammonia. Of course on the evaporation of the ammonia a substance fairly insoluble in itself may be left, but my experiments have shown that such a product will not confer upon the materials treated, the beneficial properties hereinbefore enumerated. The explanation thereof is quite simple: In order to produce a structure which is cohesive and does not crumble to a fine powder on drying, it is necessary to apply the alginate in the colloidal-gel condition.

My colloidel gel is preferably fortified as follows:—A vegetable or animal wax, for instance beeswax, is heated to a thin melt and treated with concentrated ammonia until that part of the wax consisting of the fatty acids or their corresponding oils is completely saponified. This may be most conveniently accomplished in a suitable autoclave. The aliphatic alcohols and the hydro-carbons will at the same time undergo a change that makes them most satisfactory for filming purposes. The cold ammonia-emulsoid of wax is added to the ammonio-metal alginate-gel in a suitable amount according to the concentrations of the two solutions, the mixture being constantly stirred during the addition. I have found that one liter of the fortified colloidal-ammonio-metal-gel need not contain more than 15 to 20 grams of wax in order to insure complete fortification. A small amount of formaldehyde may be added to promote the decomposition of the ammonia soaps and aid in the production of a satisfactory gel and film. The process of preparing my alginate gel and the product derived therefrom is claimed in my copending application, Serial No. 413,932, filed Sept. 30, 1920.

The solution prepared as set forth may be mixed with or caused to impregnate wood-pulp, paper-pulp or other cellular or pervious materials, either in the raw or finished state. When wood-pulp and paper-pulp are used to form weather boards, roofing slabs, roofing paper, flooring and similar fabricated articles, it is preferable to add the colloidal metal-alginate-gel to the material in bulk, before it is manufactured to the desired article, but the finished articles may be treated with the fortified colloidal metal-alginate-gel by simple immersion. In either case, care must be taken to subject the finished composition of matter or article to a thorough drying and gradual heating, in order to decompose the ammonia soaps and liberate the ammonia from the ammonio-metal-alginate-gel, leaving an insoluble and impermeable filling. It is preferred to heat gradually, and a maximum temperature of 140° F., has been found satisfactory. When a copper alginate is used as an intermediate, the resulting fortified colloidal ammonio-copper-alginate-gel will not only waterproof, indurate, confer strength, render the materials alkali-resistant and insulating, but will in addition, make them insecticide and fungicide-proof, and increase their nonflammability, the latter property being conferred by virtue of the high kindling point of the colloidal-copper-alginate-gel.

The impregnation of the material may be effected or facilitated by any of the well known methods, as for instance slight heating, vacuum impregnation, injection by force or under pressure, or it may be applied by a simple soaking or immersion or by means of a brush or similar contrivance.

My colloidal alginate-gel can be used for the treatment of a variety of organic or inorganic cellular or pervious materials, either in the raw or finished state. It is suitable for the treatment of organic materials such as vegetable fibers or fabrics of cotton, linen, jute and flax, silk and wool, inorganic substances, such as artificial stone, asbestos, and cementitious mixtures containing asbestos and a filler. Asbestos pulp treated with my fortified colloidal gel make an excellent roofing material and has its insulating qualities materially improved.

When the colloidal metal alginate-gel is added to the material in bulk, the resulting product may be pressed or shaped, as desired, by mold-treatment, or may be prepared in the form of a slab, or in a regular or irregular mass which may be cut, sawed, turned or otherwise manipulated to any other desired form or size.

The application of my fortified colloidal metal-alginate-gel to the treatment of concrete, primarily to render the same resistant to alkali-waters, but also in a measure, to reduce suction, that is its tendency to absorb water, and increase its tensile strength, is claimed in my copending application, Serial No. 413,931, filed September 30th, 1920. The film formed in the concrete capillaries is cohesive, capable of adhering to the walls of the concrete, insoluble in pure or impure waters charged with soluble substances, mainly, alkali compounds, forms a continuous impermeable coating, and instead of reducing the strength of the concrete, materially increases the breaking stress it will ordinarily stand. Concrete so treated immersed in a brine of 13000 p. p. m. sulphate concentration for a year exhibits over one hundred pounds higher strength to the square inch than concrete made of the same materials but without the fortified metal-alginate-gel incorporated immersed the same length of time in regular soft water.

Materials or articles coated or impregnated with my colloidal alginate-gel possess excellent insulating qualities, and for that reason are adapted to a wide variety of use in the electrical arts. Asbestos fibers, particularly, when impregnated with the fortified alginate-gel possess excellent insulating qualities.

As the ammonio-metal-alginates are eminently fitted for absorbing pigments and organic dyes, products made with my solution may be colored as desired.

I claim:

1. As a new composition of matter, a cellular or pervious material carrying a filling or film resulting from treatment with a colloidal-alginate-gel.

2. As a new composition of matter, a cellular or pervious material carrying a cohesive, impermeable filling or film resulting from treatement with a colloidal-alginate-gel.

3. As a new composition of matter, a cellular or pervious material carrying a cohesive, impermeable filling or film resulting from treatment with a colloidal-metal-alginate-gel.

4. As a new composition of matter, a cellular or pervious material carrying a cohesive, impermeable filling or film resulting from treatment with a colloidal-ammonio-metal-alginate-gel.

5. As a new composition of matter, a cellular or pervious material, the wall of the interstices thereof being coated with a cohesive, impermeable lining resulting from the treatment with a colloidal-ammonia-metal-alginate-gel.

6. As a new composition of matter, a cellular or pervious material carrying a filling or film resulting from treatment with a fortified colloidal-alginate-gel.

7. As a new composition of matter, a cellular or pervious material carrying a cohesive, impermeable filling or film resulting from treatment with a fortified colloidal-alginate-gel.

8. As a new composition of matter, a cellular or pervious material carrying a cohesive, impermeable filling or film resulting from treatment with a fortified colloidal-metal-alginate-gel.

9. As a new composition of matter, a cellular or pervious material carrying a cohesive, impermeable filling or film resulting from treatment with a fortified colloidal-ammonio-metal-alginate-gel.

10. As a new composition of matter, a cellular or pervious material, the walls of the interstices thereof being coated with a cohesive, impermeable lining resulting from the treatment with a fortified colloidal-ammonia-metal-alginate-gel.

11. As a new composition of matter, a cellular or pervious material carrying a cohesive, impermeable filling or film resulting from treatment with a colloidal-ammonio-metal-alginate-gel fortified with a wax.

12. As a new composition of matter, a cellular or pervious material carrying a cohesive, impermeable filling or film resulting from treatment with a colloidal-metal-alginate-gel whereby it is rendered water-proof and weather-proof, alkali-water-resistant, indurated, electrically insulating and of increased strength.

13. As a new composition of matter, a cellular or pervious material carrying a cohesive, impermeable filling or film resulting from treatment with a fortified colloidal-metal-alginate-gel whereby it is rendered water-proof, and weather-proof, alkali-water-resistant, indurated, electrically insulating and of increased strength.

14. As a new composition of matter, a cellular or pervious material carrying a cohesive, impermeable filling or film resulting from treatment with a fortified colloidal ammonio-metal-alginate-gel whereby it is rendered waterproof and weather-proof, alkali-water-resistant, indurated, electrically insulating and of increased strength.

15. As a new composition of matter, a cellular or pervious material carrying a cohesive, impermeable filling or film resulting from treatment with a colloidal ammonio-metal-alginate fortified with a wax whereby it is rendered waterproof and weather-proof, alkali-water-resistant, indurated, electrically insulating and of increased strength.

16. As a new composition of matter a cellular or pervious material carrying a cohesive, impermeable filling or film resulting from treatment with a colloidal ammonio-metal-alginate fortified with a wax and formaldehyde, whereby it is rendered waterproof and weather-proof, alkali-water-resistant, indurated, electrically insulating and of increased strength.

17. As a new composition of matter, a cellular or pervious material carrying a cohesive, impermeable filling or film resulting from treatment with a colloidal-ammonio-copper-alginate-gel, whereby it is rendered water-proof and weather-proof, alkali-water-resistant, indurated, electrically insulating; of increased strength, insecticide and fungicide-resistant, and of increased non-flammability.

18. As a new composition of matter, a cellular or pervious material carrying a cohesive, impermeable filling or film resulting from treatment with a fortified colloidal-ammonio-copper-alginate gel, whereby it is rendered water-proof and weather-proof, alkali-water-resistant, indurated, electrically insulating; of increased strength, insecticide and fungicide-resistant, and of increased non-flammability.

19. As a new composition of matter, a cellular or pervious material carrying a cohesive, impermeable filling or film resulting from treatment with a colloidal-ammonio-copper-alginate-gel fortified with a wax whereby it is rendered water-proof and weather-proof, alkali-water-resistant, indurated, electrically insulating, of increased strength, insecticide and fungicide-resistant and of increased non-flammability.

20. As an article of manufacture, a cellular or pervious slab, carrying a cohesive, impermeable filling or film resulting from treatment with a colloidal-ammonio-copper-alginate-gel.

21. As an article of manufacture, a cellular or pervious slab, carrying a cohesive, impermeable filling or film resulting from treatment with a fortified colloidal-ammonio-copper-alginate-gel.

22. As a new article of manufacture, a cellular or pervious slab, carrying a cohesive, impermeable filling or film resulting from treatment with a fortified colloidal-ammonio-copper-alginate-gel whereby it is rendered water-proof, and weather-proof, alkali-water-resistant, indurated, of increased strength, insecticide and fungicide-resistant, and of increased non-flammability.

23. As an article of manufacture, a slab of cellulosic material carrying a cohesive, impermeable filling or film resulting from treatment with a colloidal-ammonio-copper-alginate-gel.

24. As an article of manufacture, a slab of cellulosic material carrying a cohesive impermeable filling or film resulting from treatment with a fortified colloidal ammonio-copper-alginate-gel.

25. As an article of manufacture, a slab of cellulosic material carrying a cohesive, impermeable filling resulting from the treatment with a fortified colloidal-ammonio-copper-alginate-gel whereby it is rendered water-proof and weather-proof, alkali-water-resistant, indurated, of increased strength, insecticide and fungicide-resistant and of increased non-flammability.

26. As a new composition of matter, a cellular or pervious material rendered water-proof and weather-proof, alkali-water resistant, indurated and of increased strength with a cohesive, impermeable filling or film resulting from treatment with a metal alginate gel carrying incorporated therein a fortifying agent dispersed in a volatile dispersion agent adapted to evaporate without the production of soluble salts in the film.

27. As a new composition of matter a cellular or pervious material rendered water-proof and weather-proof, alkali-water resistant, indurated and of increased strength with a cohesive impermeable filling or film resulting from treatment with a fortified metal-alginate-gel prepared by reacting in the cold a chemically pure-metal-alginate with a volatile gelling agent, and thereafter adding a fortifying agent dispersed in a volatile dispersion agent, the volatile gelling and dispersion agents evaporating on gradual drying and heating, without the production of soluble salts in the film.

28. As a new composition of matter a cellular or pervious material rendered water-proof and weather-proof, alkali-water resistant, indurated and of increased strength with a cohesive, impermeable filling or film resulting from treatment with a fortified metal-alginate-gel prepared by reacting in the cold a chemically pure-metal-alginate with a volatile gelling agent, and thereafter adding wax dispersed in a volatile dispersion agent, the volatile gelling and dispersion agents evaporating on gradual drying and heating, without the production of soluble salts in the film.

29. As a new composition of matter a cellular or pervious material rendered water-proof and weather-proof, alkali-water resistant, indurated and of increased strength with a cohesive, impermeable filling or film resulting from treatment with a fortified metal-alginate-gel prepared by reacting in the cold a chemically pure metal-alginate with ammonia, and thereafter adding an ammonia emulsion of wax, the ammonia evaporating on drying and heating whereby the ammonia soaps are decomposed without the production of soluble salts in the film.

30. As a new composition of matter, a cellular or pervious material rendered water-proof and weather-proof, alkali-water resistant, indurated and of increased strength with a cohesive, impermeable filling or film resulting from treatment with a fortified metal-alginate-gel prepared by reacting in the cold a chemically pure metal-alginate with ammonia, and thereafter adding an ammonia emulsion of wax, the ammonia evaporating on gradual drying and heating to a temperature of approximately 140° F., whereby the ammonia soaps are decomposed without the production of soluble salts in the film.

31. As an article of manufacture, a slab of cellulosic material rendered water-proof and weather-proof, alkali-water resistant, indurated, electrically insulating and of increased strength with a cohesive, impermeable filling or film, resulting from treatment with a fortified metal-alginate-gel, prepared by reacting in the cold a chemically pure metal-alginate with ammonia, and thereafter adding an ammonia emulsion of wax, the ammonia evaporating on drying and heating, whereby the ammonia soaps are decomposed without the production of soluble salts in the film.

In testimony whereof I hereunto affix my signature.

BERNARD FEZLING ERDAHL.